(No Model.) 2 Sheets—Sheet 1.
F. O. BLACKWELL.
ELECTRIC MOTOR TRUCK.
No. 468,492. Patented Feb. 9, 1892.
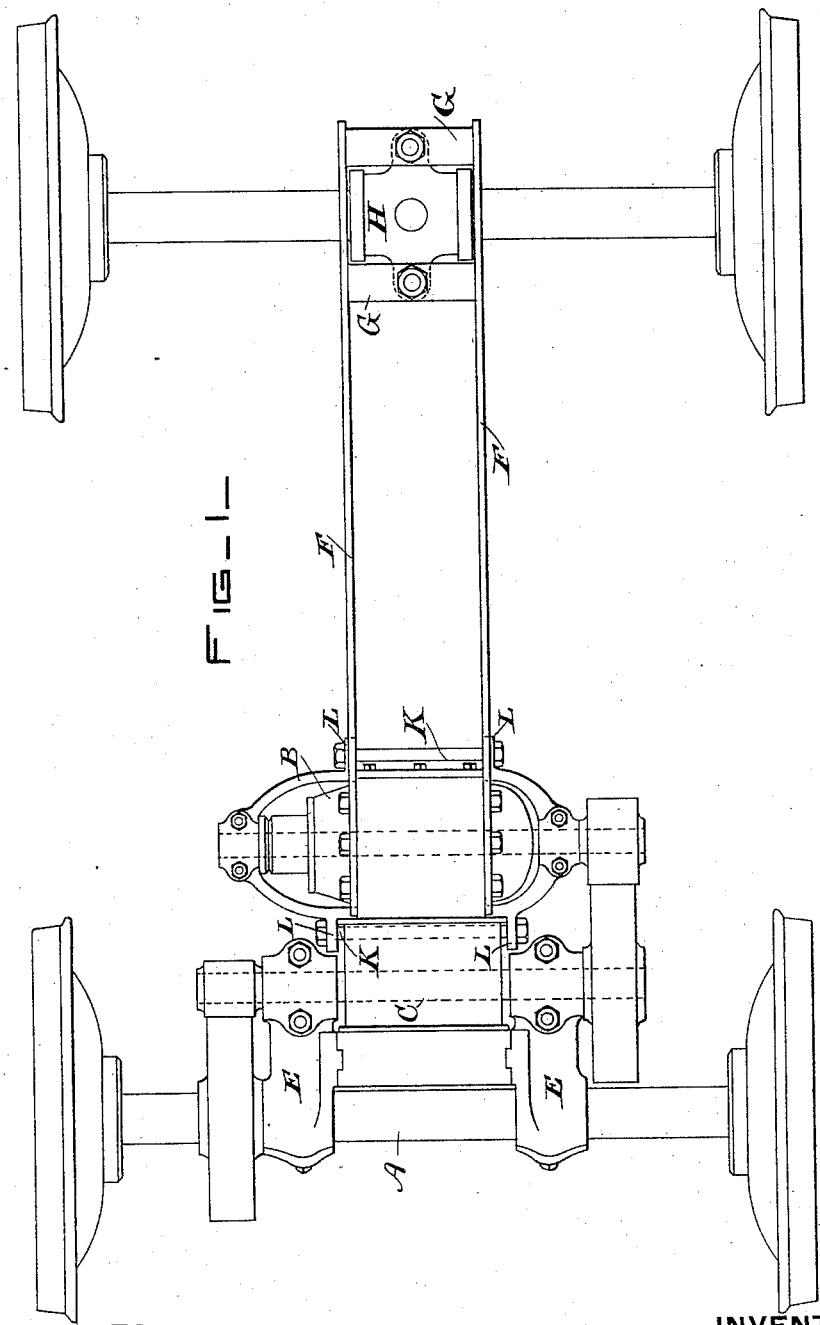
WITNESSES: INVENTOR:

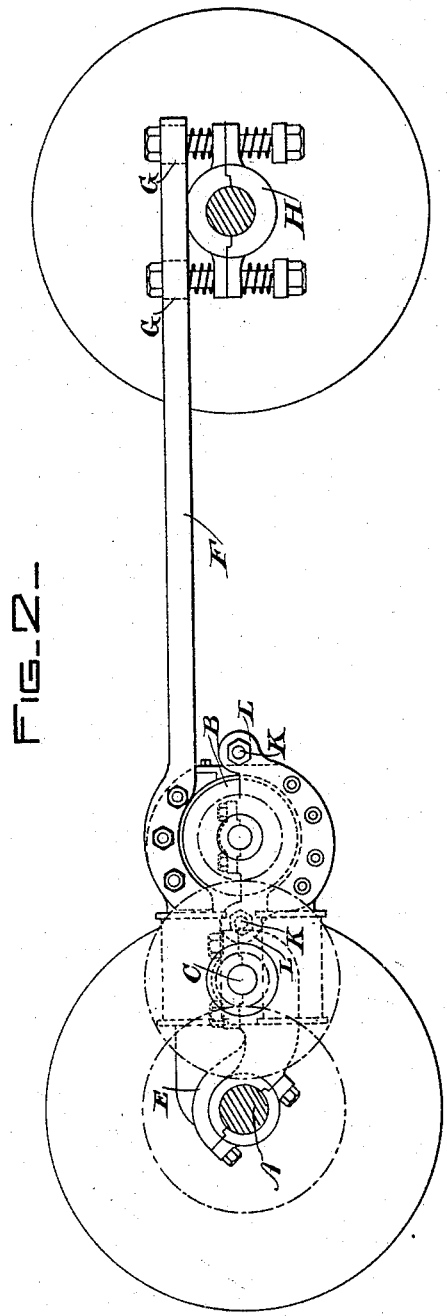

UNITED STATES PATENT OFFICE.

FRANCIS O. BLACKWELL, OF BOSTON, MASSACHUSETTS, ASSIGNOR TO THE THOMSON-HOUSTON ELECTRIC COMPANY, OF CONNECTICUT.

ELECTRIC-MOTOR TRUCK.

SPECIFICATION forming part of Letters Patent No. 468,492, dated February 9, 1892.

Original application filed September 16, 1889, Serial No. 324,150. Divided and this application filed May 1, 1891. Serial No. 391,210. (No model.)

*To all whom it may concern:*

Be it known that I, FRANCIS O. BLACKWELL, a citizen of the United States, residing at Boston, in the county of Suffolk and State of Massachusetts, have invented a certain new and useful Improvement in Electric-Motor Trucks, of which the following is a specification, this application being a division of my application, Serial No. 324,150, filed September 16, 1889.

My invention relates to electric-motor trucks, and has a special reference to the manner of mounting and supporting the motor upon the truck.

Referring to the accompanying drawings, Figure 1 is a plan, and Fig. 2 an elevation, partly in section, of a truck embodying my invention.

A represents the axle of the truck upon which the motor is journaled. The motor has its field-magnets horizontal with the yoke adjacent to the axle and the armature B supported by a casting from the lower pole-piece. C is a counter-shaft supported in bearings attached to the yoke D, and the yoke is also provided with rearward extensions E, forming the journals for the motor upon the axle. The armature is geared to the axle by speed-reducing gearing in the ordinary manner.

The free end of the motor is upheld by means of two bars F F, which are bolted to the upper pole-piece and carried over to the opposite axle, where they are provided with two cross-pieces G G and have a spring connection with a box H on the axle. The castings which uphold the armature are bolted to the lower pole-piece, and at the same time are connected by bolts K, extending across from one to the other and attached to lugs L thereon. By this construction it is at all times easy to remove the lower pole-piece and the armature from beneath, the main body of the motor being supported from above.

What I claim as new, and desire to secure by Letters Patent, is—

1. The combination, with the axles of a truck, of an an electric motor journaled upon one axle by bearings at its yoke end, a journal-box on the opposite axle, and a supporting bar or frame extending from the upper pole-piece and having a spring attachment to said journal-box.

2. The combination, with an axle of a vehicle, of a motor having bearings thereon and geared thereto, said bearings consisting of extensions from the yoke of the motor, a counter-shaft having bearings in the said extensions, and extensions from the lower pole-piece, forming the main support for the armature, whereby the lower pole-piece and the armature are removable from below.

3. The combination, with axle A, of an electric motor having its yoke D provided with bearings on the axle, and a supporting connection extending from the upper pole-piece to the opposite axle.

4. The combination, with an axle of a vehicle, of a motor geared thereto and provided with bearings thereon, supporting-bars F F, extending from the motor to the opposite axle, a transverse connection G between the bars, and a journal-box H, to which cross-piece G is connected with an intervening spring.

In testimony whereof I have hereto set my hand this 20th day of March, 1891.

FRANCIS O. BLACKWELL.

Witnesses:
EDWARD L. RANSON,
GEO. R. BLODGETT.